Patented Nov. 3, 1953

2,658,044

UNITED STATES PATENT OFFICE 2,658,044

AQUEOUS DISPERSIONS OF BUTYL RUBBER-NATURAL RUBBER BLENDS

Everett V. Anderson, Naugatuck, Conn., assignor to United States Rubber Company, New York, N. Y., a corporation of New Jersey No Drawing. Application September 11, 1952, Serial No. 309,149

6 Claims. (Cl. 260—5)

This invention relates to improvements in aqueous dispersions of Butyl rubber-natural rubber blends which are particularly useful as adhesives.

Butyl or GR–I synthetic rubber, as is known, is made by the direct copolymerization of an isoolefine and a small amount of a conjugated diene. For various uses including the manufacture of adhesives, it is desirable to obtain aqueous dispersions of Butyl rubber. Such aqueous dispersions must be prepared from the solid Butyl rubber since a latex is not formed in the Butyl rubber manufacture. Aqueous dispersions of straight Butyl rubber may be prepared by means of colloidal clays or proteins, such as casein, as the dispersing agent. It has also been suggested to employ glycol esters of higher fatty acids as dispersing agents for Butyl rubber. While colloidal clays, proteins and alkali soaps are all well known dispersing agents for natural rubber and various resins, straight Butyl rubber will not disperse on the alkali soaps. Butyl rubber, however, when admixed or blended with natural rubber, may be dispersed on alkali soaps.

Aqueous dispersions of blends of Butyl rubber and natural rubber are of value as adhesives, particularly when compounded with conventional tackifying (tack-producing) resins. The present invention relates to increasing the adhesive strength of films deposited from aqueous dispersions of blends of Butyl rubber and natural rubber.

I have found that if the dispersed particles of Butyl rubber-natural rubber blend in an aqueous dispersion thereof are vulcanized while in the dispersed state, films deposited from such aqueous dispersions will have a greatly improved adhesive strength which is maintained under conditions of severe ageing. This is particularly surprising since it is known that films from vulcanized rubber latex possess an absence of tackiness characteristic of vulcanized rubber (see Flint "The Chemistry and Technology of Rubber Latex," pages 334–5, published by Van Nostrand 1938).

In carrying out the present invention, there is prepared an aqueous dispersion of a blend or mixture of Butyl rubber and unvulcanized natural rubber containing conventional dispersing agent (e. g. alkali soaps or glycol esters of long chain saturated or unsaturated fatty acids having 10 to 20 carbon atoms, proteins and/or colloidal clay), and vulcanizing ingredients (sulfur and zinc oxide and accelerator, or sulfur and zinc-containing accelerator). The dispersion is subjected to vulcanizing conditions, i. e., heated if the accelerator is a high-temperature accelerator or allowed to stand at room temperature or heated if the accelerator is a low temperature- or ultra-accelerator. Agents for modifying the physical properties of deposits or films from the dispersion, such as tackifyers, may be incorporated in the dispersion before or after the vulcanization of the blended rubber particles.

It is known that natural rubber in admixture with Butyl rubber will become vulcanized at the expense of the Butyl rubber due to the greater response of natural rubber to sulfur and other vulcanizing ingredients, i. e., the natural rubber robs the Butyl rubber of its share of vulcanizing ingredients (see U. S. Patent to Beekley et al. 2,332,194). Where the Butyl rubber in the Butyl rubber-natural rubber blend before dispersing in the present invention is unvulcanized similarly to the natural rubber, presumably only the natural rubber phase of the particles of Butyl rubber-natural rubber blend will become vulcanized. If it is desired also to have the Butyl rubber phase of the dispersed particles of the rubber blend vulcanized, the Butyl rubber should be vulcanized prior to blending with the unvulcanized natural rubber particles (as taught by U. S. Patent 2,332,194) before dispersing and vulcanizing the blended particles. The dispersed particles of the Butyl rubber-natural rubber blend may be said to undergo vulcanization or to be vulcanized even though the natural rubber phase or content of the particles receives most or all of the combined sulfur during such vulcanization. It is clear from the examples below that such vulcanization of the dispersed particles of Butyl rubber-natural rubber blend does give rise to great improvement in the adhesive properties of films deposited from such vulcanized dispersions. This is diametrically opposite the known result of the vulcanization of straight unvulcanized natural rubber dispersions (e. g., natural latex), where the deposit from such vulcanized latices are characterized by their decreased tackiness.

The following illustrates the invention, all parts, percentages, ratios and proportions referred to herein being by weight:

Example I 250 parts of natural rubber (smoked sheet) were banded on a rubber mill, that is, formed into a continuous band around the front slower roll of the mill, and 750 parts of Butyl rubber (copolymer of 98 to 99% isobutylene and 2 to 1% of isoprene) were fed into the band and milling continued until the two rubbers were well blended. The blended rubbers were transferred to an internal mixer of the Werner and Pfleiderer (W. & P.) type equipped with a cooling jacket. There was added to the blended rubbers in the W. & P. mixer with thorough mixing the following: 5 parts of a commercial antioxidant (sym. di-beta-naphthyl-paraprenylene-diamine); 800 parts of a commercial tackifying resin "Piccolyte S-85" (a thermoplastic, terpene resin consisting essentially of polymers of beta pinene; melting point approx. 85° C. by ball and ring test; acid number 0; non-saponifiable); 200 parts of another commercial tackifying resin "Stabelite resin" (hydrogenated rosin, melting point approx. 70° C. by ball and ring test; acid number 162; saponifiable), 10 parts of sulfur, 2.5 parts of zinc oxide, and 120 parts of oleic acid. 140 parts of 28% aqueous ammonia and water were mixed into the batch until inversion in phase and dispersion of the compounded Butyl rubber-natural rubber blend in the aqueous medium. 150 parts of 10% aqueous potassium hydroxide solution were added followed by further water to the desired solids concentration of 70% total solids. 5 parts of accelerator (zinc dibutyl dithiocarbamate) were added to the dispersion in the form of an aqueous paste. The purpose of relaying the addition of the accelerator until after phase inversion was to avoid premature vulcanization of the undispersed batch which would have rendered phase inversion difficult to achieve. Obviously, if desired, the sulfur and zinc oxide could be added as pastes to the finished dispersion. The addition of the potassium hydroxide confers additional stability to allow immediate dumping and screening of the dispersion, otherwise the dispersion should stand for some hours after preparation to acquire the necessary mechanical stability. A second dispersion was prepared in the identical manner as the above dispersion with the exception that the vulcanizing ingredients (sulfur, zinc oxide and accelerator) were omitted.

To demonstrate the effect of vulcanization in the dispersed state of the particles of Butyl rubber-natural rubber blend, the two dispersions prepared as above were heated to 60° C. and maintained at 60° C. for 18 hours. The first dispersion became vulcanized in this period while the second did not. The dispersions were cooled to room temperature and spread on 8 oz. duck fabric and allowed to dry at room temperature overnight. The coated duck fabrics were then plied together with moderate pressure and test specimens 1″ x 6″ died out. One set of test specimens (unaged) was tested after standing 24 hours in a desiccator over calcium chloride. The other set of test specimens (aged) was placed in an oxygen bomb at 300 pounds per sq. in. pressure and 70° C. for 48 hours, and then tested. Testing of adhesive strength was done on a Scott tensile machine using a jaw separation speed of 2″ per minute, results being recorded as the average pull required to separate the 1″ wide strips of duck. The pull on the unaged and aged test strips with the first vulcanized dispersion was 9.1 lbs. in each case. The pull on the unaged and aged test strips with the second unvulcanized dispersion was 1.1 lbs. and 0.2 lb., respectively.

The above example is merely illustrative of the invention. The Butyl rubber is prepared by the polymerization of a mixture of a major proportion of isoolefine and a minor proportion of conjugated diene in the presence of a Friedel Crafts polymerization catalyst of the type of aluminum chloride or boron trifluoride. The conjugated diene may be 0.5 to 15 per cent by weight of the polymerizable mixture, and correspondingly the copolymer may contain 0.5 to 15 percent by weight of the conjugated diene component and 99.5 to 85 percent by weight of the isoolefine component. Examples of such isoolefines are isobutylene (dimethyl ethylene), 2-methyl butene-1 (ethyl ethylene), 2-ethyl butene-1 (diethyl ethylene), and examples of such conjugated dienes are butadiene-1,3, isoprene (methyl-2-butadiene-1,3), 2,3-dimethyl butadiene-1,3, piperylene (pentadiene-1,3). Details of the preparation of such isoolefin-conjugated diene copolymers may be found in U. S. Patents 2,356,128; 2,356,129; 2,356,130; 2,332,194 and in the articles in Industrial and Engineering Chemistry, vol. 32, pages 1283–92 (1940) and vol. 41, pages 2834–40 (1949). The soap dispersing agent, which is the preferred type of dispersing agent, may be an alkali soap (alkali-metal, ammonium or amine soap) of a soap-forming monocarboxylic acid having 10 to 20 carbon atoms. The amount of soap will generally be 3 to 15% by weight of the Butyl rubber-natural rubber blend. The soap-forming acid may be a member of the saturated fatty acid series ($C_nH_{2n}O_2$), or of the unsaturated fatty acid series ($C_nH_{2n-2}O_2$) or ($C_nH_{2n-4}O_2$), or a mixture of such 3 to 15% of fatty acids with rosin acids as in tall oil acids. Examples of such soap-forming acids of the fatty acid series are capric, undecanoic, lauric, myristic, palmitic, margaric, stearic, oleic, linoleic and arachidic acids. Other conventional dispersing agents that may be used are glycol esters of such long chain saturated or unsaturated fatty acids having 10 to 20 carbon atoms, or proteins or colloidal clays, or mixtures of any of the above. The Butyl rubber and natural rubber may be blended in a Banbury mixer instead of on a mill roll before transferring to the W. & P. mixer. Also, the Butyl rubber and natural rubber may be blended in the W. & P. mixer prior to the dispersing operation therein, but this is not a recommended procedure due to the strain placed on the machine. The ratio of natural rubber to Butyl rubber in the blend may be in the range from 1:10 to 1:1. The sulfur for vulcanization of the dispersed particles may be from 0.05 to 5% of the natural rubber. The tackifying resins may be omitted, or may be in amount up to 2 times the weight of the Butyl rubber-natural rubber blend. Such tackifyers may be wood rosin and its modified forms, such as hydrogenated and esterified rosins, coumarone-indene resins, terpene resins, asphalt and allied bitumals, and various other thermoplastic materials commonly employed as tackifying resins.

*Example II*

Three blends of Butyl rubber with increasing proportions of natural rubber were prepared by banding the natural rubber on a rubber mill and mixing in the Butyl rubber. The Butyl rubber was a copolymer of 98 to 99% isobutylene and 2 to 1% of isoprene. The natural rubber was unvulcanized smoked sheet. The ratios of natural rubber to Butyl rubber were 40:60 (sample A), 50:50 (sample B), and 75:25 (sample C) in the three batches. To 100 parts of each of the three blends on the mill was added 7.5 parts of a mixture of fatty acids (22% palmitic, 75% stearic and 3% oleic acids). The blends containing the fatty acid were transferred to a W. & P. mixer and separately dispersed by addition of 8 parts of 28% aqueous ammonia and enough water to give an inversion in phase with subsequent dilution to 60% total solids dispersion. 0.25 parts of zinc oxide and 0.5 part of zinc dibutyl dithiocarbamate were added to each dispersion in the form of aqueous pastes. Each of the three dispersions was divided into seven portions. To six of the portions were added various amounts of sulfur from 0.1 to 1.5 parts per 100 parts of natural rubber in the dispersed particles of the natural rubber-Butyl rubber blends. The seven portions of each of the three dispersions were heated to 60° C. and maintained at that temperature for 24 hours with occasional agitation. Test films were obtained from each of the compounds by deaerating to remove entrained air, casting on glass plates and drying at room temperature. One set of films was heated 15 minutes at 100° C. to determine if further cure could be obtained. Tensile strength tests were made on the unheated and heated films. Tensile strength results in pounds per sq. in. ("0" meaning no pull) are shown in the following table:

| Parts sulfur added per 100 parts of natural rubber in the dispersion | Sample A—40 natural rubber: 60 butyl rubber | | Sample B—50 natural rubber: 50 butyl rubber | | Sample C—75 natural rubber: 25 butyl rubber | |
|---|---|---|---|---|---|---|
| | Film | | Film | | Film | |
| | Unheated | Heated | Unheated | Heated | Unheated | Heated |
| 0.0 | 55 | 45 | 0 | 0 | 0 | 0 |
| 0.1 | 125 | 120 | 290 | 300 | 230 | 380 |
| 0.25 | 120 | 145 | 255 | 320 | 380 | 460 |
| 0.50 | 145 | 175 | 250 | 180 | 310 | 320 |
| 0.75 | 160 | 190 | 135 | 150 | 175 | 170 |
| 1.00 | 80 | 105 | 125 | 120 | 65 | 95 |
| 1.50 | 75 | 115 | 70 | 75 | 45 | 65 |

The general close agreement in tensile values of heated and unheated films indicates that the sulfur was substantially all combined during heating of the dispersions. The increasing tensile strengths of the blends indicate that the natural rubber phase is vulcanized while the Butyl rubber phase remains substantially unvulcanized.

*Example III*

30 parts of crude natural rubber (smoked sheet) were banded on a rubber mill and 70 parts of Butyl rubber (copolymer of 98 to 99% isobutylene and 2 to 1% of isoprene) were fed into the band and the two rubbers were well blended, after which the batch was transferred to a W. & P. mixer. There was added to the batch in the W. & P. mixer with thorough mixing 0.5 part of sym. di-betanaphthyl-para-phenylene diamine (antioxidant), 50 parts of a commercial tackifying resin "Stabilite Ester #10" (glycerol ester of hydrogenated rosin, melting point 80–85° C.; acid number 10; non-saponifiable), and 11 parts of a mixture of fatty acids (22% palmitic, 75% stearic and 3% oleic acids). 12 parts of 28% aqueous ammonia and water were added to an inversion in phase with subsequent dilution with water to 60% total solids. The dispersion was divided into five portions. Aqueous pastes containing 0.25 part of zinc oxide and 0.50 part of zinc dibutyl dithiocarbamate was added to four of the five dispersion portions, and there was also added varying amounts of sulfur paste to the same four portions (viz. 0.25, 0.50, 0.75 and 1.0 part of sulfur, respectively). One portion of the dispersion thus did not contain vulcanizing ingredients. The five portions of the dispersion were heated to 60° C. and maintained at that temperature for 24 hours to vulcanize the dispersed particles of the Butyl rubber-natural rubber blend. The compounds were then spread on 8 oz. duck fabric which was plied wet. Test specimens 1" x 6" were died out. One set was tested after standing 24 hours in a desiccator (unaged) and another set was tested after ageing in an oxygen bomb similarly to the test pieces in Example I.

The pulls on the unaged test strips were 3.5 lbs. for the adhesive without sulfur, and 4.0 lbs., 4.0 lbs., 8.4 lbs., and 8.5 lbs. for the adhesives with 0.25, 0.5, 0.75 and 1.0 part of sulfur, respectively. The pulls on the aged test strips were 1.7 lbs. for the adhesive without sulfur, and 8.7 lbs., 8.8 lbs., 8.4 lbs. and 8.4 lbs. for the adhesives with 0.25, 0.5, 0.75 and 1.0 part of sulfur, respectively. It is thus shown that vulcanization of the dispersed particles of the Butyl rubber-natural blend increases the adhesive strength of the dispersion in aged and unaged samples.

This application is a continuation-in-part of my copending application Serial No. 145,917, filed February 23, 1950, now abandoned.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A composition comprising a dispersion of particles of a blend of a rubbery copolymer of a major proportion of isoolefine and a minor proportion of conjugated diene and natural rubber in an aqueous medium, the natural rubber portion of the blend being vulcanized in its aqueous dispersed state in the blend in the presence of 0.05 to 5% of sulfur based on the natural rubber, said composition containing material selected from the group consisting of alkali soaps of soap-forming monocarboxylic acids having 10 to 20 carbon atoms, glycol esters of fatty acids having 10 to 20 carbon atoms, proteins and colloidal clays, the ratio of natural rubber to copolymer in said blended particles being in the range from 1:10 to 1:1.

2. A composition comprising a dispersion of particles of a blend of a rubbery copolymer of a major proportion of isobutylene and a minor proportion of isoprene and natural rubber in an aqueous medium, the natural rubber portion of the blend being vulcanized in its aqueous dispersed state in the blend in the presence of 0.05 to 5% of sulfur based on the natural rubber, said composition containing an alkali soap of fatty acid having 10 to 20 carbon atoms, the ratio of natural rubber to copolymer in said blended particles being in the range from 1:10 to 1:1.

3. A composition comprising a dispersion of particles of a blend of a rubbery copolymer of a major proportion of isobutylene and a minor proportion of isoprene and natural rubber in an aqueous medium, the natural rubber portion of the blend being vulcanized in its aqueous dispersed state in the blend in the presence of 0.05 to 5% of sulfur based on the natural rubber, said composition containing 3 to 15% by weight of said blend of an alkali soap of a soap-forming acid having 10 to 20 carbon atoms, the ratio of natural rubber to copolymer in said blended particles being in the range from 1:10 to 1:1.

4. A composition comprising a dispersion of particles of a blend of a rubbery copolymer of a major proportion of isoolefine and a minor proportion of conjugated diene and natural rubber in an aqueous medium, the natural rubber portion of the blend being vulcanized in its aqueous dispersed state in the blend in the presence of 0.05 to 5% of sulfur based on the natural rubber, said composition containing 3 to 15% by weight of said blend of an alkali soap of fatty acid having 10 to 20 carbon atoms, the ratio of natural rubber to copolymer in said blended particles being in the range from 1:10 to 1:1.

5. A composition comprising a dispersion of particles of a blend of a rubbery copolymer of a major proportion of isoolefine and a minor proportion of conjugated diene and natural rubber in an aqueous medium, the natural rubber portion of the blend being vulcanized in its aqueous dispersed state in the blend in the presence of 0.05 to 5% of sulfur based on the natural rubber, said composition containing an alkali soap of fatty acid having 10 to 20 carbon atoms, the ratio of natural rubber to copolymer in said blended particles being in the range from 1:10 to 1:1, and said dispersed particles comprising tackifying resin in amount up to twice the weight of the copolymer-natural rubber blend.

6. A composition comprising a dispersion of particles of a blend of a rubbery copolymer of a major proportion of isobutylene and a major proportion of isoprene and natural rubber in an aqueous medium, the natural rubber portion of the blend being vulcanized in its aqueous dispersed state in the blend in the presence of 0.05 to 5% of sulfur based on the natural rubber, said composition containing material selected from the group consisting of alkali soaps of soap-forming monocarboxylic acids having 10 to 20 carbon atoms, glycol esters of fatty acids having 10 to 20 carbon atoms, proteins and colloidal clays, the ratio of natural rubber to copolymer in said blended particles being in the range from 1:10 to 1:1, and said dispersed particles comprising tackifying resin in amount up to twice the weight of the copolymer-natural rubber blend.

EVERETT V. ANDERSON.

References Cited in the file of this patent

UNITED STATES PATENTS

| Number | Name | Date |
|---|---|---|
| 1,849,920 | Gibbons et al. | Mar. 15, 1932 |
| 1,964,771 | Schur | July 3, 1934 |
| 2,194,958 | Szegvari | Mar. 26, 1940 |
| 2,332,194 | Beekley et al. | Oct. 19, 1943 |
| 2,418,250 | Drake | Apr. 1, 1947 |
| 2,450,579 | Brown | Oct. 5, 1948 |
| 2,467,322 | Lightbown et al. | Apr. 12, 1949 |

FOREIGN PATENTS

| Number | Country | Date |
|---|---|---|
| 112,875 | Australia | Apr. 24, 1941 |